United States Patent [19]
Martin

[11] 3,757,972
[45] Sept. 11, 1973

[54] VEHICLE CARRIER ASSEMBLY AND METHOD

[75] Inventor: Harold G. Martin, Twin Falls, Idaho

[73] Assignee: TDM Corporation, Burley, Idaho

[22] Filed: May 12, 1971

[21] Appl. No.: 142,498

[52] U.S. Cl. .................................. 214/85, 214/450
[51] Int. Cl. .............................................. B60p 1/44
[58] Field of Search ............... 214/83.24, 85, 38.10, 214/450; 104/45, 46

[56] References Cited
UNITED STATES PATENTS

| | | | |
|---|---|---|---|
| 2,667,295 | 1/1954 | Johnston | 214/450 |
| 3,536,214 | 10/1970 | Sorg | 214/85 |
| 3,095,987 | 7/1963 | Sable | 214/38 A |
| 3,613,920 | 10/1971 | Flamm | 214/85 |
| 2,994,159 | 8/1961 | Bonidie | 214/38 A |
| 3,025,985 | 3/1962 | Crawford | 214/505 |

Primary Examiner—Gerald M. Forlenza
Assistant Examiner—John Mannix
Attorney—H. Ross Workman

[57] ABSTRACT

A vehicle carrier including method and apparatus having a supporting frame which is removably connected to a conventional truck, trailer or other suitable transportable bed. A carrier is rotatably connected to the supporting frame so that the carrier is rotatable through as many as 360°. A peripheral barrier exists along both sides and at each end of the carrier, the end barriers being selectively displaceable to provide ingress and egress ways. A ramp is detachably connected to the carrier at the ingress or egress way. In the method of using the carrier assembly, the carrier is oriented either parallel to the transportable bed or projecting transversely away from the transportable bed. The ingress barrier is displaced out of the way and the ramp attached so that a vehicle can drive onto the carrier. When it is desired to remove the vehicle, the carrier may be rotated to either side of the transportable bed or toward the rear end of the bed, the barrier removed and the ramp attached so that the vehicle can be easily driven forwardly off the carrier without manually lifting or backing the vehicle from the carrier.

7 Claims, 9 Drawing Figures

Patented Sept. 11, 1973
3,757,972
3 Sheets-Sheet 1
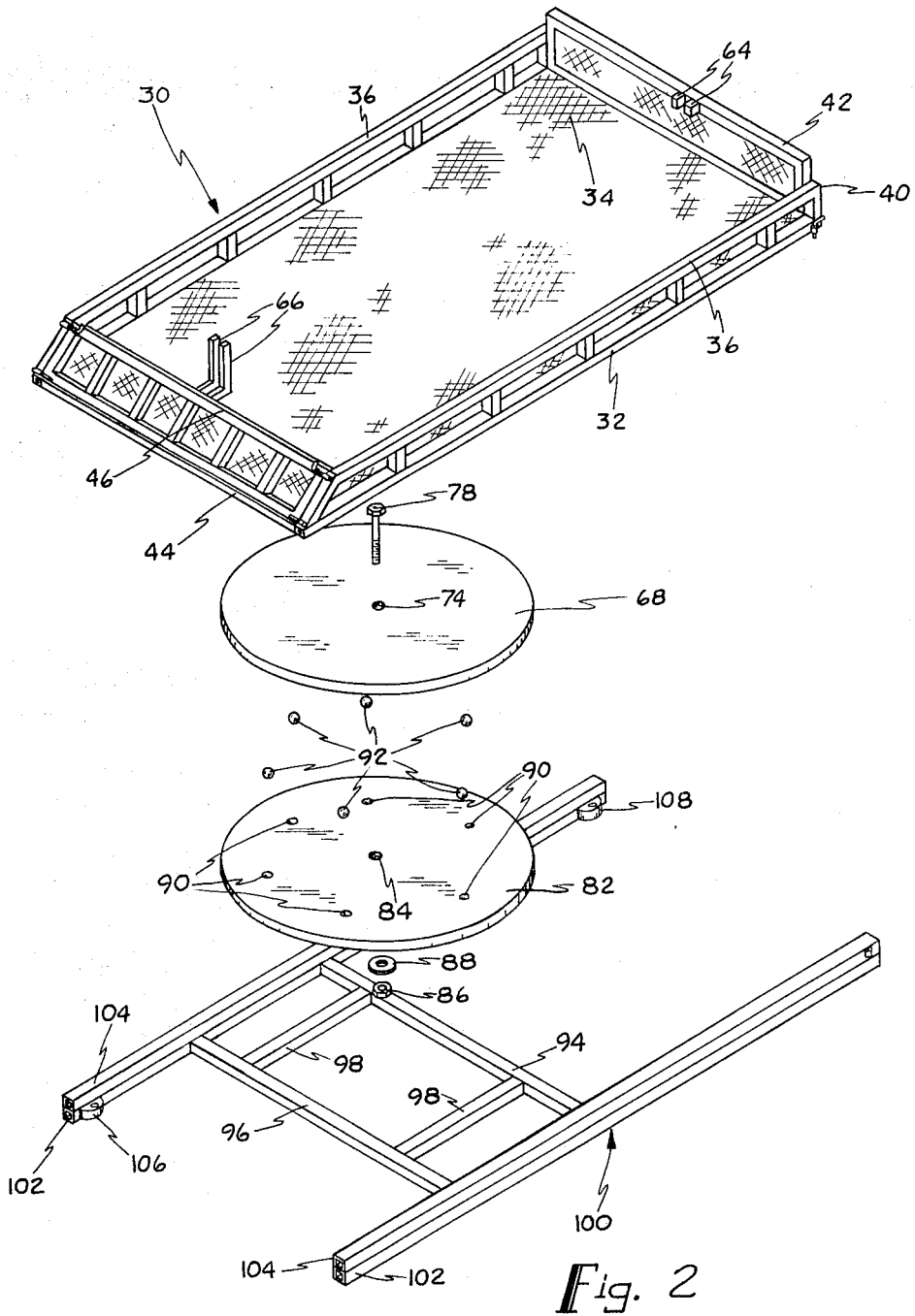
Fig. 2
Fig. 4
INVENTOR.
HAROLD G. MARTIN
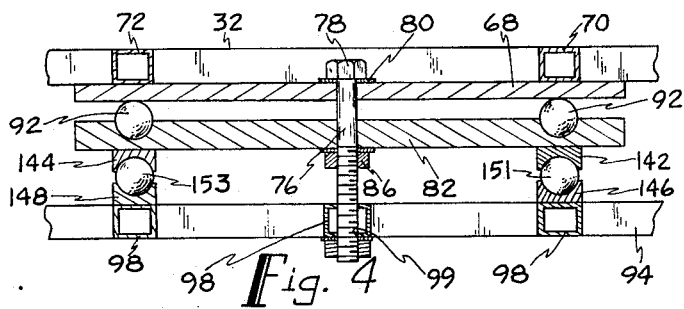
BY
HIS ATTORNEY Patented Sept. 11, 1973

INVENTOR.
HAROLD G. MARTIN
BY H. Rose Workman
HIS ATTORNEY

Patented Sept. 11, 1973

INVENTOR.
HAROLD G. MARTIN
BY H. Ross Workman
HIS ATTORNEY

VEHICLE CARRIER ASSEMBLY AND METHOD

BACKGROUND

1. Field of the Invention

The present invention relates to vehicle carrier assemblies and more particularly to apparatus and method for loading, transporting and unloading vehicles or other transportation means.

2. The Prior Art

Historically, when vehicles such as snowmobiles and the like are loaded into a truck or upon a trailer, the snowmobile must be manually lifted into the rear end of the truck or trailer, anchored in place and, after removal to a desired location, again manually lifted from the truck bed or trailer.

Conventionally, even if the snowmobile is driven over a ramp to the bed of the truck, removal of the snowmobile from the truck is awkward and difficult. For example, if the snowmobile is driven onto the truck, the only access way to the truck bed will be at the rear of the snowmobile. To remove the snowmobile from the truck, it is usually necessary for two persons to lift the front and rear of the snowmobile and physically carry the snowmobile from the truck bed. Most truck beds are not sufficiently wide to allow the snowmobile to be turned so that the front of the snowmobile faces the access way to the truck bed.

Moreover, even if the truck bed were sufficiently wide to allow the snowmobile to be turned approximately 180° to face the access way to the truck bed, it requires efforts of two persons to manually lift and rotate the snowmobile in position prior to removing the snowmobile from the truck bed. Until this present invention, no rapid, efficient and simple way of loading and unloading snowmobiles or other vehicles from trucks or trailers has been provided.

BRIEF SUMMARY AND OBJECTS OF THE INVENTION

The present invention, including apparatus and method, provides a system for easily loading a snowmobile or other vehicle on a carrier rack removably attached to conventional trucks or trailers. The snowmobile may be easily loaded by a single person from the rear end of the truck or from either side, as desired. Once the snowmobile is loaded, the carrier may be rotated through any desired number of degrees of rotation to allow the snowmobile to be driven forwardly off from the truck or trailer. Thus, a single person may easily load and unload a snowmobile or other vehicle from a truck or trailer without difficulty.

It is, therefore, a primary object of the present invention to provide an improved vehicle carrier assembly.

It is another primary object of the present invention to provide a novel method of loading and unloading vehicles from truck or trailer beds.

These and other objects and features of the present invention will become more fully apparent from the following description and appended claims taken in conjunction with the accompanying drawings.

BRIEF DESCRIPTION OF THE DRAWINGS

FIG. 2 is an exploded perspective view illustrating the component parts of the apparatus of FIG. 1;

FIG. 4 is a transverse cross-sectional view of another turning apparatus embodiment which may be used with the apparatus of FIG. 1;

DETAILED DESCRIPTION OF THE PREFERRED EMBODIMENTS

Reference is now made to the figures wherein the preferred method and apparatus embodiments will be described. In the various views, like numbers will be used to designate like parts throughout.

THE APPARATUS

The apparatus of the present invention relates primarily to the so-called "piggy-back" transportation of one vehicle by another. It is within the scope of this invention to transport snowmobiles, motorcycles, livestock or any sort of self-propelling vehicle or animal which more easily moves forward than reverse and which from time to time need to be transported on a vehicle. The carrier herein described may be mounted on a truck, truck bed or trailer or any other transporting vehicle having a relatively rigid bed. For simplicity, the following description will relate primarily to snowmobile loading and unloading onto and off a pickup truck or the like.

Figure 1:
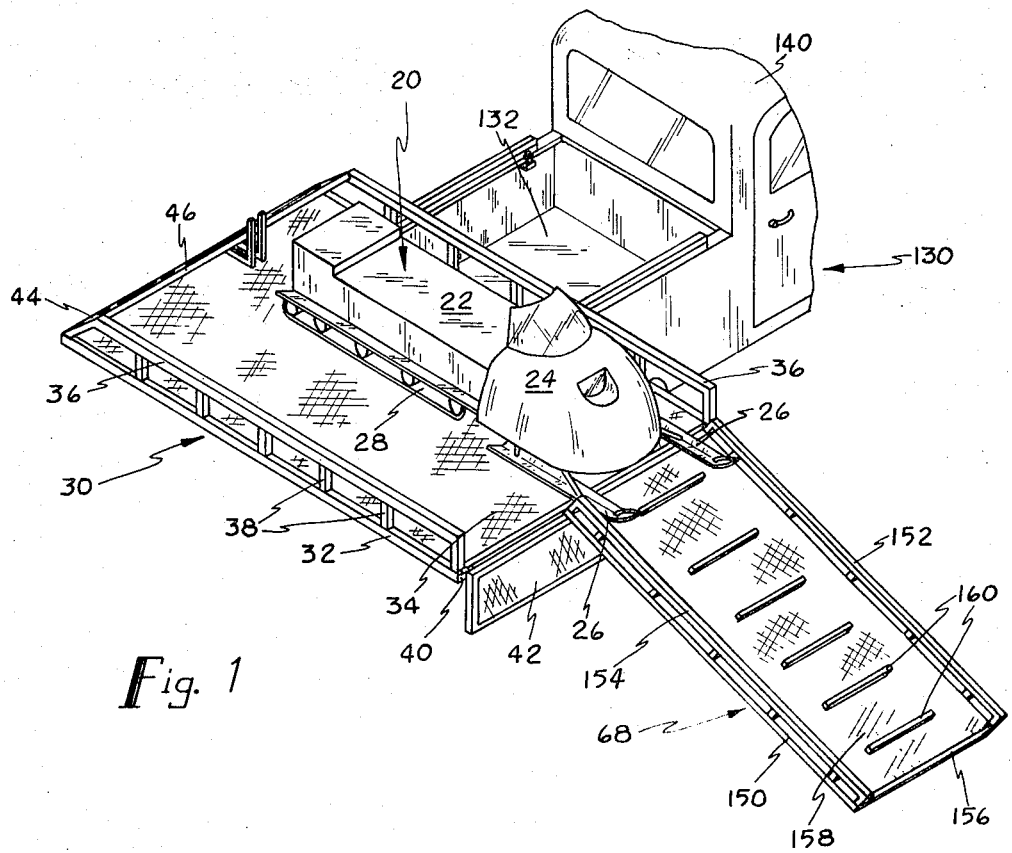
FIG. 1 is a fragmentary perspective illustration of a presently preferred carrier apparatus embodiment of the invention illustrated in an orientation rotated 90° from its at-rest state in an unloading position.

Referring more particularly to FIG. 1, a snowmobile generally designated 20 conventionally includes a seat 22, an engine housing 24, front skiis 26 and a driving track 28. The snowmobile shown in FIG. 1 is situated upon a carrier generally designated 30. In the illustrated embodiment, the carrier 30 is constructed of square iron tubing 32 comprising a rectangular platform 32. The platform 32 is covered with steel mesh 34 or any other suitable covering which has been welded at spaced locations over the rectangular frame. Preferably, spaced reinforcing members (not shown in FIG. 1) are disposed beneath the expanded metal mesh 34 to give support to the mesh.

It is presently preferred that the carrier 30 be sufficiently wide to accommodate two snowmobiles in side-by-side relation. Further, barriers or side rails 36 are provided on each side of the carrier 30 to prevent the snowmobile 20 from inadvertently falling from the edge of the platform 32. The side rails 36 are also formed of square metal tubing and are welded at each end to the platform 32 and at intermediate spaced locations to braces 38 which give support to the side rails 36. Clearly, if desired, the carrier 30 may be formed of solid metal or round tubular metal or any other suitably strong construction material.

The front end 40 of the carrier 30 is provided with an end barrier or gate 42 hingedly connected to the platform 32 near the junction of the side rails 36. The front gate 42, shown in the open position in FIG. 1, is shown in the closed position in FIG. 2. The trailing end 44 of the carrier 30 is similarly provided with an end barrier or rear gate 46 more clearly shown in FIG. 2.

Figure 6:
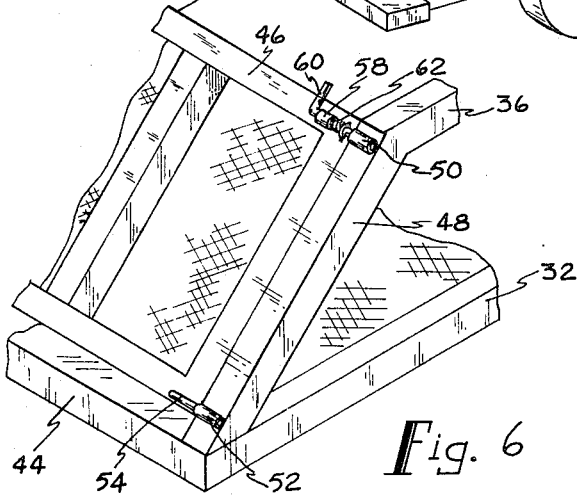
FIG. 6 is a fragmentary perspective view of coupling apparatus used with the front and rear gates of the carrier of FIG. 1.

Referring specifically to FIG. 6, the side rail 36 is joined to the platform 32 by an angularly-oriented connecting member 48. The connecting member 48 has spaced cylindrical sleeves 50 and 52 welded or otherwise permanently attached to the rear sloping surface of the connecting member 48. A connecting rod 54, welded to the gate 46, is oriented so as to be in alignment with the sleeve 52 and to project into the sleeve 52 so that the gate 46 will rotate in hinge-like fashion around the axis of rod 54 and sleeve 52. Thus, gate 46 may be displaced from the position illustrated in FIGS. 2 and 6 to the position illustrated in FIG. 9 as will be hereinafter more fully described. Clearly, any suitable hinge connection could be used.

Figure 8:
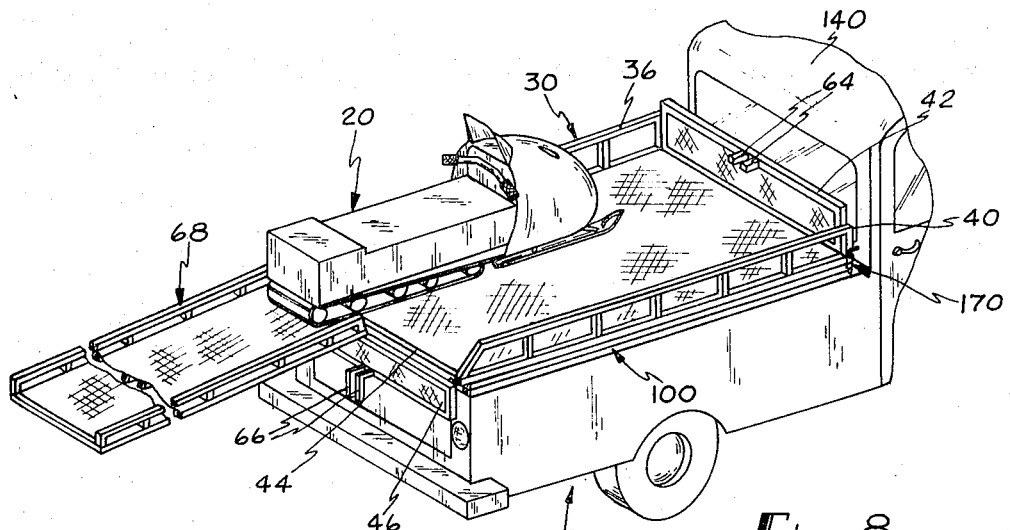
FIG. 8 is a perspective illustration of one preferred loading position for a snowmobile.
Figure 9:
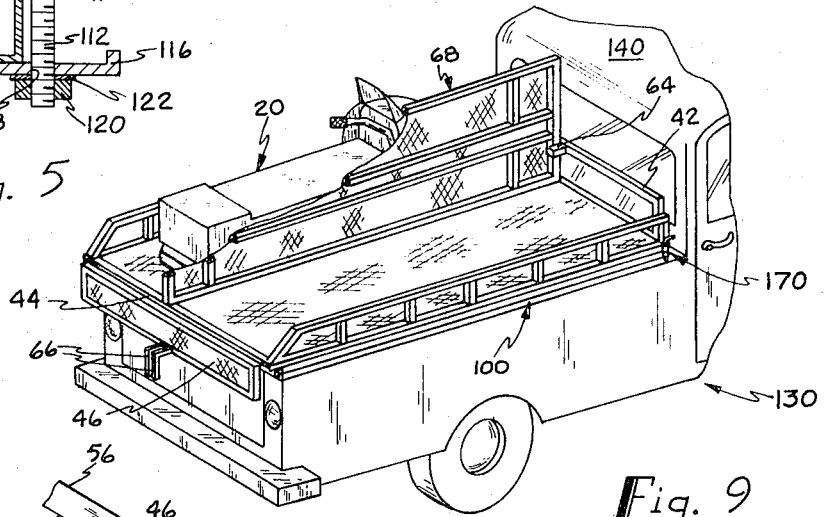
FIG. 9 is a fragmentary perspective illustration of the carrier apparatus with mounted snowmobile and detachable ramp shown in stored position.

The upper end 56 of the gate 46 has welded thereon a second annular sleeve 58 into which a latching dog 60 is situated. The latching dog 60 is continuously biased toward the illustrated extended position by a spring 62. As shown in FIG. 6, the gate 46 is normally locked in the closed position. However, when desired, the fastening dog 60 may be displaced against the bias of the spring 62 so as to be removed from the sleeve 50 thereby allowing the gate 46 to rotate upon the axis of rod 54 to an open position as shown in FIGS. 8 and 9. If desired, the front gate 42 may have hinge and latching structure substantially identical to that described for gate 46.

Gate 42 is provided with spaced guides 64, each of which projects outwardly from the upper edge of the gate 42 toward the rear of the carrier 30 when the gate 42 is in the closed position illustrated in FIG. 2. Similarly, gate 46 has guides 66 mounted thereon which project forwardly and upwardly in a dog-leg configuration toward the front of carrier 30 when gate 46 is in the closed position illustrated in FIG. 2. The guides 64 and 66 function as holding brackets for the loading and unloading ramp generally designated 68 (FIG. 1) as will be hereinafter more fully described.

With continued reference to FIG. 2, an annular plate 68 is mounted on the underside of the platform 32. The mounting of the plate 68 on platform 32 is best understood by reference to FIG. 3. Plate 68 is welded or otherwise rigidly secured to crossing support beams 70 and 72 comprising part of platform 32. The plate 68 has a centrally disposed annular aperture 74 through which the shank 76 of bolt 78 passes. If desired, a washer 80 may be interposed between the bolt head 78 and the plate 68.

Figure 3:
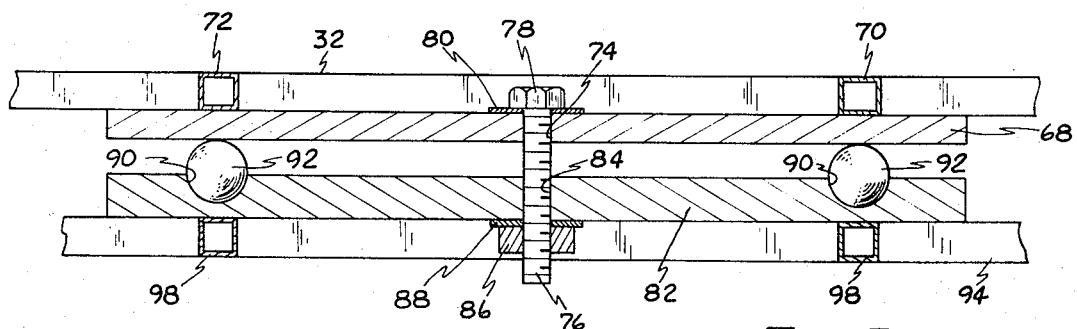
FIG. 3 is a transverse cross-sectional view of the turning structure used with the embodiment of FIG. 1.

A lower plate 82 is aligned with the upper plate 68 and is similarly provided with a centrally-disposed annular aperture 84. As shown in FIG. 3, the shank 76 of the bolt 78 also passes through the aperture 84 and a locking nut 86 and washer 88 join the plates 68 and 82 together.

Plate 82 is provided with a plurality of radially-spaced preferably hemispherically-configurated grooves 90. Each groove is adapted to receive a spherical bearing 92. As shown in FIG. 3, the spherical bearings rest in their corresponding grooves and support a portion of the upper plate so that the weight carried by the upper plate 68 is distributed over the lower plate through the bearings 92. Furthermore, the mentioned arrangement allows the plate 68 to be rotated relative to the plate 82 around the axis of the bolt 76. The plates 68 and 82, bolt 78 and bearings 92 therefore comprise a swivel assembly.

The plate 82 is welded or otherwise rigidly mounted upon cross-members 94 and 96 (FIG. 2) and upon lateral braces 98 such as by welding or the like. Cross-members 94 and 96 and lateral braces 98 form a part of the carrier support frame generally designated 100.

Figure 5:
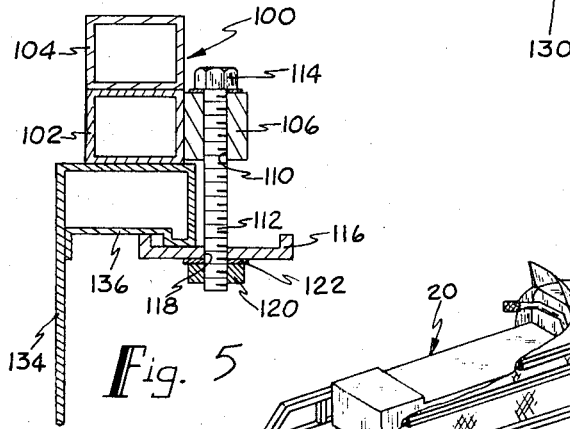
FIG. 5 is a transverse cross-sectional view of anchoring apparatus used to anchor the support frame to a truck bed.

As shown in FIG. 2, the carrier support frame 100 comprises tandem support bars 102 and 104 each of which is permanently joined to the other. The lower bars 102 are also welded or otherwise connected to the cross-members 94. Each of the lower bars 102 has inwardly-projecting flanges 106 and 108. Flanges 106 and 108 accommodate securing of the carrier support 100 to the bed of a truck or trailer in such a way that the carrier support and connected snowmobile carrier can be quickly and easily removed from the truck, when desired. For example, as shown in FIG. 5, the flange 106 projecting from the lower bar 102 has a vertically-oriented bore 110 through which the shank 112 of a bolt 114 passes. A generally U-shaped bracket 116 has a centrally-disposed aperture 118 through which the shank 112 loosely passes. A nut 120 and lock washer 122 secure the bracket 116 at any one of a plurality of vertical positions along the shank 112 of bolt 114.

Conventionally, a truck generally designated 130 and shown in FIGS. 1, 8 and 9 has a truck bed 132 with sides 134 shown in FIG. 5. The sides have an inwardly-projecting normally hollow shelf or rail 136 against which the U-shaped bracket 116 is tightly compressed by the bolt 120. When desired, the support frame 100 can be rapidly and efficiently removed by disconnecting bolts 120 from the shank 112, removing the bolt 114 and lifting the support frame 100 and attached carrier 30 from the truck. Because the carrier 30, when attached, is spaced above the truck bed, the truck bed can easily be used for storage even when the carrier 30 and frame 100 are attached.

Referring again to FIG. 2, it is observed that the cross-members 94 and 96 and the supporting braces 98 are situated approximately one-third of the distance from the trailing end 44 of the carrier 30. This placement was selected to maximize the clearance of the front end 40 from the truck cab 140 (see FIGS. 1, 8 and 9) when the carrier 30 is rotated from the aligned position shown in FIGS. 8 and 9 to the position illustrated in FIG. 1. It has been found that when the axis of bolt 78 is displaced rearward from the leading end 40 of the carrier 30, the carrier 30 can be placed somewhat closer to the cab 140 of the truck and still rotate to the FIG. 1 position without scraping the truck cab. However, if desired, the alternative embodiment illustrated in FIG. 4 could be used.

Structure for displacing the swivel assembly and attached carrier 30 to and fro parallel to the length of the truck bed is shown in FIG. 4. The platform 32 and support frame 100 are joined together by plates 68 and 82 with bolt 76 as described in FIG. 3, above. In this embodiment, however, the bolt 78 is caused to extend through an elongated slot 99 in central brace 98. The lower surface of plate 82 is provided with parallel upper bearing races 142 and 144 each of which presents a downwardly-opening concave groove. Braces 98, situated between cross-members 94 and 96 on the support frame 100, are rigidly secured to lower bearing races 146 and 148. Bearing races 146 and 148 present upwardly-opening concave grooves which are in vertical alignment with the grooves of upper bearing races 142 and 144.

Preferably, bearings 151 are interposed between the races 142 and 146 and bearings 153 are interposed between races 144 and 148. Thus, the entire swivel assembly and the carrier 30 can be easily reciprocated upon the bearings 151 and 152 along a line parallel with the bed of the truck 130. Preferably, the amount of displacement of the carrier 30 is specifically defined by the length of slot 99.

Using the structure illustrated in FIG. 4, the carrier 30 may be forwardly displaced until the front end 40 is juxtaposed the cab 140 (see FIG. 8). When it is desired to rotate the carrier 30 to the FIG. 1 position, the carrier 30 and attached pivot assembly is displaced rearward of the truck a few inches to allow the carrier to be rotated to the FIG. 1 position without hitting or scraping the cab 140.

Figure 7:
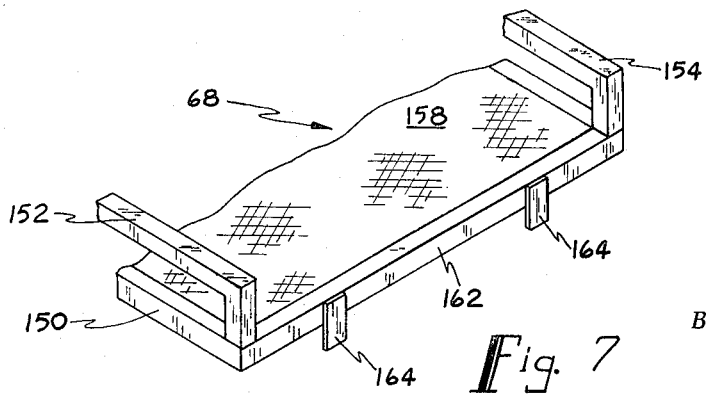
FIG. 7 is a fragmentary perspective view of the attaching structure carried by the ramp.

Reference is now made more particularly to FIGS. 1 and 7 which illustrate the construction of ramp 68. Ramp 68 facilitates loading and unloading of the carrier 30 by providing a track over which the snowmobile is driven onto or off the carrier 30.

As shown in FIG. 1, the ramp 68 is formed of square metal tubing in essentially the same way that the carrier 30 is formed. Ramp 68 comprises a rectangular platform 150, the longest sides of the platform 150 being only slightly shorter than the length of the carrier 30. Side rails 152 and 154 function as guides to prevent the snowmobile 20 from inadvertently falling from the ramp 68 to the ground before it reaches the remote end 156.

The platform 150 has a plurality of support members (not shown in FIG. 1) over which a metal mesh 158 is rigidly mounted. If desired, a plurality of spaced members 160 can be mounted in the center of the ramp 68 along its entire length, the members 160 giving traction and stability to the snowmobile 20 as it is driven over the ramp 68. While the members 160 are shown as part of the illustrated embodiment of FIG. 1, clearly, their use is optional and the scope of this invention would include a ramp with or without members 160.

Referring more particularly to FIG. 7, the proximal end 162 of the ramp 68 is shown in fragmentary perspective. The proximal end 162 normally attaches to the carrier 30 at either the front end 40 or the rear end 44 so that the snowmobile 20 may be driven off the carrier 30 or onto the carrier 30, respectively. Attachment of the ramp 68 to the carrier 30 is facilitated by downwardly-projecting brackets 164. Brackets 164 project substantially below the lower surface of platform 150 and are adapted to rest over the lower edge of gate 42, as shown in FIG. 1 or, alternatively, over the lower edge of gate 44 as shown in FIG. 8. While the brackets 164 may have any suitable configuration, the configuration illustrated in FIG. 7 has been found to accommodate rapid attachment and detachment from the front and rear gates while at the same time minimizing the risk of inadvertent detachment of the ramp 68 from the carrier 30.

THE METHOD

Having described the structure of the carrier assembly, reference is now made to the preferred method embodiment of the invention and attention is directed particularly to FIGS. 1, 8 and 9.

Initially, the carrier 30 and connected support frame 100 are mounted on the truck 130. The mounting structure shown in FIG. 5 is used to secure the carrier support 100 to the side rails of the truck parallel to the truck bed. Preferably, attaching structure similar to that shown in FIG. 5 is located at each of the four corners of the carrier support 100 to insure a secure attachment to the truck 130.

In the normal position for transporting a snowmobile, the carrier 30 is oriented so that the front end 40 is adjacent the truck cab 142 and the side rails 36 are parallel to the truck bed. As shown in FIG. 8, the carrier 30 may be easily loaded from this normal position. The loading sequence includes opening the rear gate 46 so that the access way at the rear end 44 is unobstructed. The ramp 68 is then attached to the gate 46 preferably adjacent one of the side rails 36, and the snowmobile 20 is driven forwardly onto the carrier 30. If desired, the ramp 68 may then be laterally displaced adjacent the opposite side rail 36 so that a second snowmobile (not shown) may be driven onto the carrier 30 so as to be in side-by-side relation with snowmobile 20.

With the snowmobile 20 properly positioned upon the carrier 30, the ramp 68 is mounted in a vertical position upon the carrier 30 as shown in FIG. 9. The vertical position is maintained by situating the ramp 68 between the forward brackets 64 and the rear brackets 66. Thus, the ramp 68 is at all times easily accessible from either the front or the rear of the carrier 30. Clearly, if desired, the ramp 68 may be carried in any other suitable position such as upon the truck bed, beneath the carrier 30.

Since the position of the carrier 30 illustrated in FIGS. 8 and 9 is the preferred position when driving the truck and associated snowmobile from place to place, it is preferable to provide a locking device, generally designated 170, at one of the corners of the carrier 30. The locking device 170, if desired, may be substantially the same as the latching mechanism for the front and rear gates, such as that shown in FIG. 6. The locking device 170 will be normally displaced in an aperture or other suitable receiver in the truck side wall.

In unloading the snowmobile 20 from the carrier 30, the locking device 170 is released and the carrier 30 is rotated about the axis of bolt 78 (FIGS. 2 and 3) to the position illustrated in FIG. 1. Thereafter, the front gate 42 is open so that the egress way at the front end 40 of the carrier 30 is unobstructed. The ramp 68 is then attached to the carrier 30 at the gate 42 so that the snowmobile may be driven forwardly off the carrier 30. Removing the snowmobile from the carrier 30 at a direction essentially normal to the length of the bed of the truck has been found to be highly advantageous in many instances. For example, frequently snow is piled along the sides of a road to substantial depths. Historically, it has been extremely difficult to lift a snowmobile over the steep snowbank caused by road scrapers and the like. Using the presently preferred embodiment of the invention, the carrier 30 can be oriented as shown in FIG. 1 and the ramp 68 situated so as to bridge between the carrier 30 and the roadside snowbank. Thus, the snowmobile can be driven directly over the snowbank.

It may also be desirable to drive the snowmobile directly from the carrier 30 to a roadbed immediately behind the truck 130. When so desired, the carrier 30 may be rotated another 90 degress from the position shown in FIG. 1 so that the snowmobile 20 may be driven onto the roadbed in a direction exactly opposite that shown in FIG. 8. Thus, as can be appreciated from this description, the carrier 30 may be rotated through any of 360 degrees to make loading and unloading of the snowmobile most convenient.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A vehicle carrier assembly comprising:
   a supporting frame;
   means for mounting the supporting frame upon a transportable bed;
   means for carrying the vehicle upon the supporting frame, and wherein said carrying means is generally horizontally disposed and comprises front and rear barriers which are displaceable to a position which does not obstruct ingress and egress from the carrying means;
   means for coupling the supporting frame to the carrying means, said coupling means comprising opposed plates, one of which is rotatable along a path of arcuate movement relative to the other about a vertical axis displaced rearwardly along the center line of the frame; and
   means for loading and unloading the carrying means at any one point within the field of points along the path of arcuate movement.

2. A vehicle carrier assembly as defined in claim 1 further comprising means for maintaining the vertical axis in a first forward position and means for laterally moving the vertical axis along the center line of the frame to a second, rearward position.

3. A vehicle carrier assembly as defined in claim 1 further comprising friction-reducing means including bearings, each situated within a bearing race formed in the plates.

4. A vehicle carrier assembly as defined in claim 1 wherein said loading and unloading means comprises a ramp removably attachable to the carrying means to form a bridge which the vehicle traverses during ingress to and egress from the carrying means.

5. A vehicle carrier assembly as defined in claim 1 wherein said mounting means comprises means facilitating removal of the supporting frame from the transportable bed.

6. A vehicle carrier assembly comprising:
   a mounting frame rigidly connectable upon a transportable bed, the frame comprising a first rigidly attached plate disposed rearwardly along the center line of the frame;
   a carrying platform comprising a peripheral barrier, opposing portions of the barrier being displaceable to form essentially unobstructed diametrically opposed ingress and egress ways for a vehicle and a second plate rigidly mounted upon the underside of the platform and generally aligned with the first plate;
   a pivot connecting the first and second plates and comprising means allowing the plates to rotate one relative to the other about an essentially vertical axis;
   antifriction means interposed between the plates so that the carrying platform can be easily rotated about the essentially vertical axis relative to the mounting frame; and
   a ramp detachably connectable to the platform at each of the ingress and egress ways to provide access for the vehicle to and from the carrying platform.

7. A vehicle carrier assembly as defined in claim 6 further comprising means for laterally displacing the second plate and connected first plate and carrying platform to and fro over a limited distance relative to the mounting frame.

* * * * *